US012617050B2

(12) United States Patent
Genozono

(10) Patent No.: US 12,617,050 B2
(45) Date of Patent: May 5, 2026

(54) PROCESSING MACHINE AND UNLOADING METHOD OF WORKPIECE

(71) Applicant: DISCO CORPORATION, Tokyo (JP)

(72) Inventor: Jiro Genozono, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 324 days.

(21) Appl. No.: 18/603,477

(22) Filed: Mar. 13, 2024

(65) Prior Publication Data

US 2024/0316707 A1 Sep. 26, 2024

(30) Foreign Application Priority Data

Mar. 24, 2023 (JP) ................................. 2023-048271

(51) Int. Cl.
*B23Q 3/08* (2006.01)
*B23Q 7/00* (2006.01)
(52) U.S. Cl.
CPC ............. *B23Q 3/088* (2013.01); *B23Q 7/006* (2013.01)
(58) Field of Classification Search
CPC ................................. B23Q 3/088; B23Q 7/006
See application file for complete search history.

(56) References Cited

U.S. PATENT DOCUMENTS

2013/0264780 A1* 10/2013 Iwashita ................. H10P 72/78
29/559

FOREIGN PATENT DOCUMENTS

JP 2013184269 A 9/2013
JP 2022025341 A 2/2022

* cited by examiner

*Primary Examiner* — Jason L Vaughan
*Assistant Examiner* — Amanda Kreiling
(74) *Attorney, Agent, or Firm* — Greer Burns & Crain Ltd.

(57) ABSTRACT

A processing machine has a holding unit, which includes a holding surface, a suction valve, an air ejection valve, a water ejection valve, a plurality of suction openings, and a suction-openings suction valve that establishes or interrupts communication between the suction openings and a suction source. An unloading method of a wafer in the processing machine includes a separation step of separating the wafer from the holding surface by closing the suction valve and opening the air ejection valve and the water ejection valve such that a mixed fluid of air and water is supplied to the holding surface, and an unloading step of unloading, from the holding surface, the wafer separated from the holding surface. The separation step includes a drawing step of opening the suction-openings suction valve and drawing the mixed fluid outside of the holding surface.

2 Claims, 9 Drawing Sheets

PROCESSING MACHINE AND UNLOADING METHOD OF WORKPIECE

BACKGROUND OF THE INVENTION

Field of the Invention

The present invention relates to a processing machine for processing a workpiece such as a wafer held on a holding surface of a holding unit, and also to an unloading method of the workpiece by separating, from the holding surface of the holding unit, the workpiece processed by the processing machine.

Description of the Related Art

For example, a grinding machine that grinds a workpiece such as a wafer applies grinding processing to the workpiece at its upper surface by establishing communication of a holding surface of a chuck table of a holding unit with a suction source, and bringing grinding stones, which are secured in an annular pattern, into contact with the upper surface of the workpiece held under suction on the holding surface while rotating the grinding stones. After completion of the grinding processing on the workpiece, a mixed fluid of water and air is ejected from the holding surface of the chuck table to separate the workpiece from the holding surface, and the separated workpiece is unloaded by a transfer pad (see, for example, Japanese Patent Laid-open No. 2022-025341).

In Japanese Patent Laid-open No. 2013-184269, a holding release method of a plate-shaped workpiece, such as a wafer, held on a holding surface of a holding table when unloading the plate-shaped workpiece is proposed. According to the holding release method, a supply pressure of a mixed fluid from a fluid supply source to the holding surface is detected, thus ensuring release of a suction holding force from the holding table and hence separation of the plate-shaped workpiece from the holding surface of the holding table irrespective of differences in the size of a holding pad of unloading means or in the thickness of the plate-shaped workpiece.

SUMMARY OF THE INVENTION

When the mixed fluid is ejected from the holding surface to separate the workpiece from the holding surface for the unloading of the workpiece, the mixed fluid contains processing debris drawn to the holding surface during the processing of the workpiece. The mixed fluid with the processing debris contained therein blows out from an outer periphery of the workpiece floating from the holding surface, so that the workpiece is contaminated at its side surface and upper surface with the processing debris. Hence, there is a need to remove the processing debris by rinsing the workpiece after its separation from the holding surface. This requires a longer rinsing time, leading to a problem of low efficiency.

The present invention therefore has as its objects the provision of a processing machine and an unloading method of a workpiece that, when the fluid is ejected from a holding surface to separate the workpiece from the holding surface for the unloading of the workpiece, can prevent splashing of fluid with processing debris contained therein and can perform rinsing of the workpiece in a short period of time.

In accordance with a first aspect of the present invention, there is provided a processing machine including a holding unit that has a holding surface and holds a workpiece under suction on the holding surface, a processing unit that processes the workpiece held under suction on the holding surface, and a controller that controls the holding unit and the processing unit. The holding unit includes a suction valve that establishes or interrupts communication between the holding surface and a suction source, a fluid ejection valve that establishes or interrupts communication between the holding surface and a fluid supply source, a plurality of suction openings that are arranged in a ring pattern outside of the holding surface and draw fluid ejected from the holding surface, and a suction-openings suction valve that establishes or interrupts communication between the suction openings and the suction source. The controller is configured to control closing of the suction valve, opening of the fluid ejection valve, and opening of the suction-openings suction valve.

In accordance with a second aspect of the present invention, there is provided an unloading method of a workpiece for unloading the workpiece, the workpiece being held under suction on a holding surface of a holding unit communicating with a suction source, from the holding surface, with use of a processing machine. The processing machine includes a holding unit having a holding surface, a processing unit that processes the workpiece held under suction on the holding surface, and a controller configured to control the holding unit and the processing unit. The holding unit includes a suction valve that establishes or interrupts communication between the holding surface and the suction source, a fluid ejection valve that establishes or interrupts communication between the holding surface and a fluid supply source, a plurality of suction openings that are arranged in a ring pattern outside of the holding surface and draw fluid ejected from the holding surface, and a suction-openings suction valve that establishes or interrupts communication between the suction openings and the suction source. The unloading method includes a separation step of separating the workpiece from the holding surface by closing the suction valve and opening the fluid ejection valve and supplying the fluid to the holding surface, and an unloading step of unloading, from the holding surface, the workpiece separated from the holding surface. The separation step includes a drawing step of opening the suction-openings suction valve and drawing the fluid outside of the holding surface.

According to the unloading method of the second aspect of the present invention that is performed with use of the processing machine of the first aspect of the present invention, adopted is a configuration in which the suction-openings suction valve is opened to draw the fluid outside of the holding surface by concurrently performing the drawing step when separating the workpiece from the holding surface by closing the suction valve and opening the fluid ejection valve and supplying the fluid to the holding surface of the holding unit in the separation step. The fluid which contains the processing debris drawn to the holding surface during the processing of the workpiece is thus drawn from the suction openings outside of the holding surface after the fluid with the processing debris contained therein has been supplied to a clearance between the holding surface and the workpiece (the workpiece has been caused to float from the holding surface).

The fluid with the processing debris contained therein hence does not blow out from an outer periphery of the workpiece, and the processing debris contained in the fluid does not contaminate the workpiece at its side surface and upper surface. As a result, the fluid with the processing debris contained therein is prevented from splashing, thus enabling rinsing of the workpiece to be performed in a short period of time. As an additional advantageous effect, contamination of a transfer pad is also prevented as the fluid with the processing debris contained therein is drawn from the suction openings.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
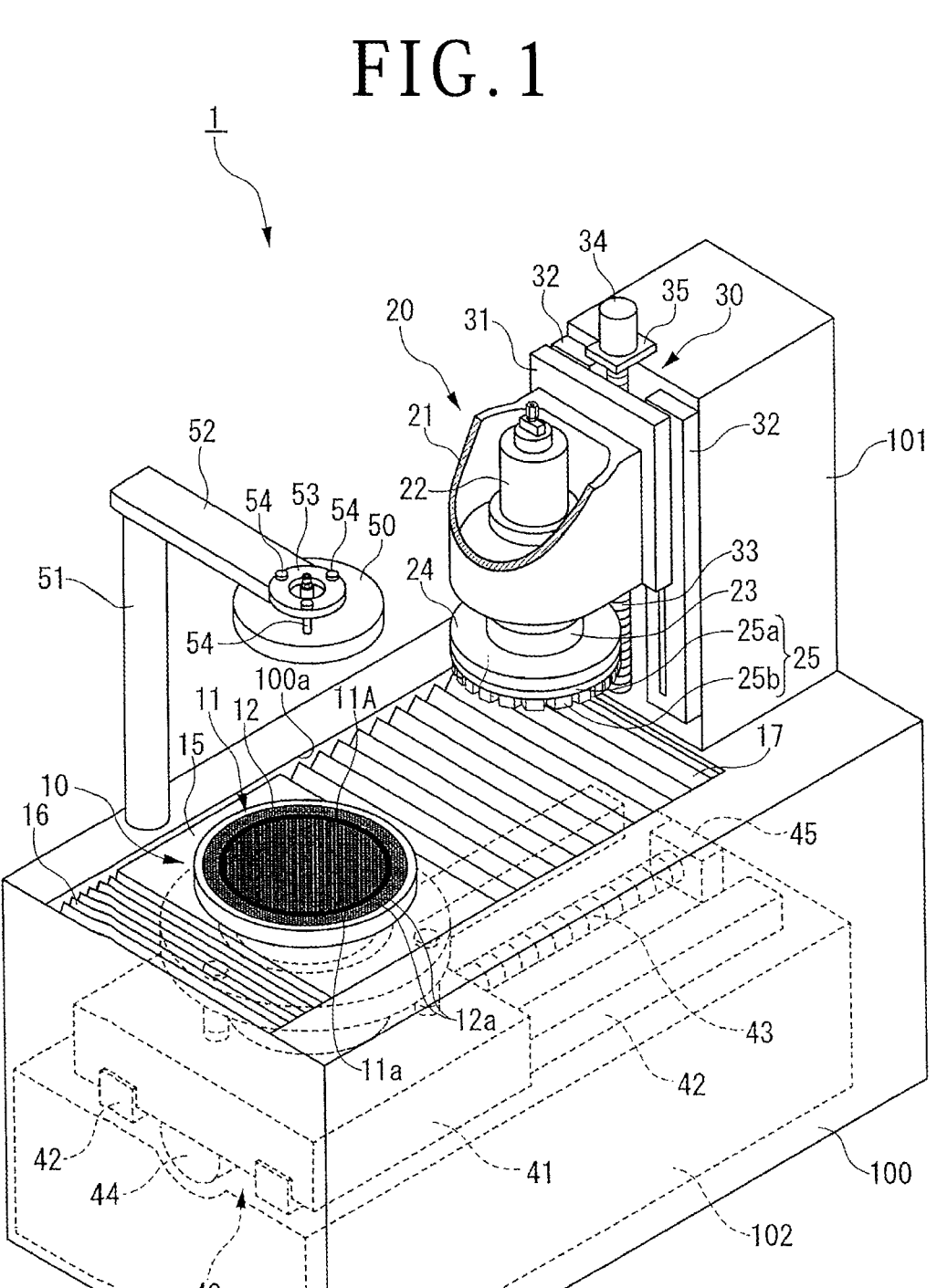
FIG. 1 is a partly transparent, perspective view depicting a grinding machine as a processing machine according to a first embodiment of the first aspect of the present invention.

With reference to the attached drawings, a first embodiment of the first aspect of the present invention and first and second embodiments of the second aspect of the present invention will hereinafter be described. The configuration of a grinding machine 1 as a processing machine according to the first embodiment of the first aspect of the present invention will first be described with reference to FIG. 1. The grinding machine 1 depicted in FIG. 1 is useful in applying grinding processing to a disk-shaped wafer W (see FIG. 3) as a workpiece, and includes elements to be described next. It is to be noted that, in the following description, the directions of arrows indicated in FIG. 1 are an X-axis direction (left-to-right direction), a Y-axis direction (front-to-rear direction), and a Z-axis direction (up-to-down direction), respectively.

Figure 3:
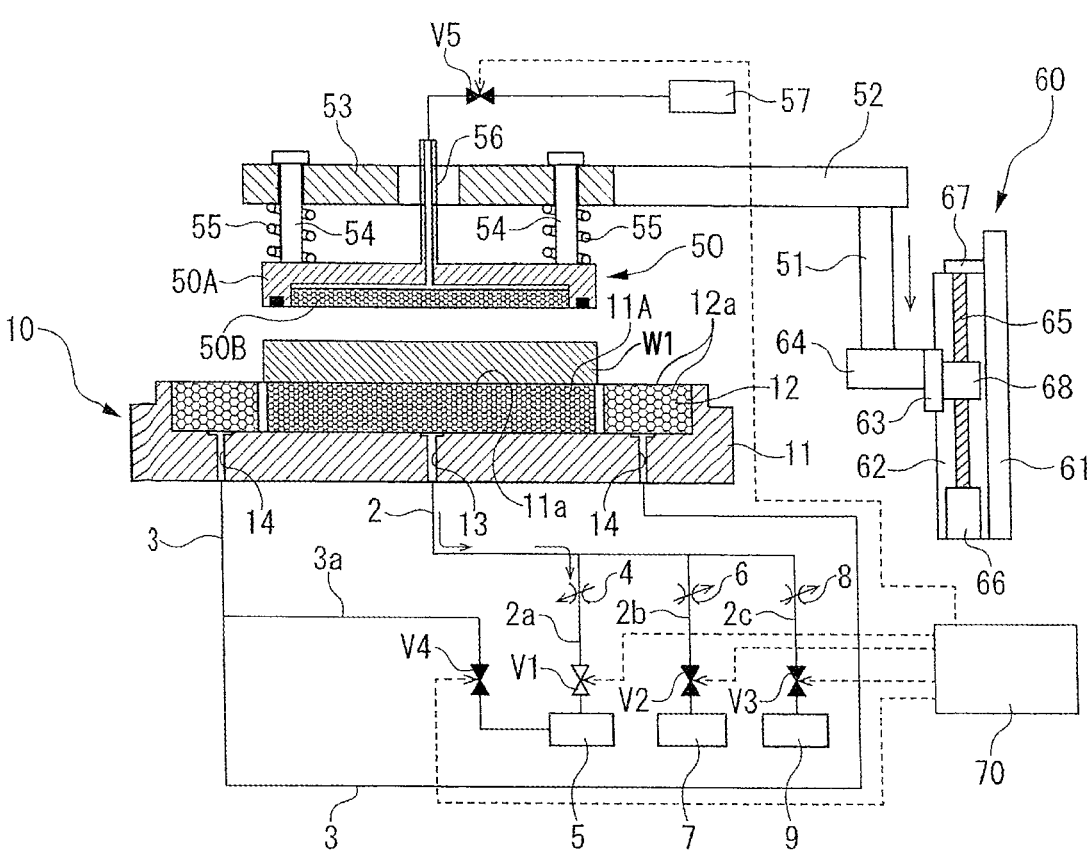
FIG. 3 is a partly cross-sectional view depicting a lowering step of the transfer pad in a workpiece unloading method according to a first embodiment of the second aspect of the present invention.

Described specifically, the grinding machine 1 includes, as principal elements, a holding unit 10 including a chuck table 11 which holds the wafer W on a circular holding surface 11a as an upper surface thereof, a grinding unit 20 as a processing unit that applies grinding processing to the wafer W held under suction on the holding surface 11a of the chuck table 11, a vertical moving mechanism 30 that moves the grinding unit 20 up and down in a vertical direction (Z-axis direction) relative to the holding surface 11a of the chuck table 11, a horizontal moving mechanism 40 that moves the chuck table 11 in a horizontal direction (Y-axis direction), a transfer pad 50 that holds and transfers the wafer W, and a controller 70 (see FIG. 3).

Here, the wafer W is formed of a single-crystal silicon base material, and on its front surface directed downward in the posture depicted in FIG. 3, a plurality of undepicted devices are formed. These devices are protected by an undepicted protective tape bonded to the front surface of the wafer W. The wafer W is held at its front surface (a lower surface in FIG. 3) under suction on the holding surface 11a of the chuck table 11, and is ground at its back surface (an upper surface in FIG. 3) by a plurality of grinding stones 25b of the grinding unit 20.

A description will next be made of the configuration of each of the principal elements of the grinding machine 1, that is, the holding unit 10, the grinding unit 20, the vertical moving mechanism 30, the horizontal moving mechanism 40, the transfer pad 50, and the controller 70.

The chuck table 11 included in the holding unit 10 is a disk-shaped member, and in a central portion thereof, a disk-shaped porous member 11A formed of a porous ceramic material or the like is incorporated. The porous member 11A constitutes at an upper surface thereof the holding surface 11a that holds the disk-shaped wafer W under suction. Radially outside of the porous member 11A, a ring-shaped porous suction member 12 is arranged in such a manner as to surround the porous member 11A from outside. A number of suction openings 12a are open in an upper surface of the suction member 12.

Now described with reference to FIG. 3, a single communication channel 13, which communicates with the porous member 11A, is vertically formed through a central portion of the chuck table 11, and to this communication channel 13, a single conduit 2 is connected. In an outer peripheral portion of the chuck table 11, a plurality of communication channels 14 (only two of them are depicted in FIG. 3) are vertically formed in communication with the suction member 12, and to these communication channels 14, conduits 3 are connected, respectively.

From the conduit 2 extending from the communication channel 13, three branch conduits 2a, 2b, and 2c are branched. The branch conduit 2a is connected to a suction source 5 via a flow rate control valve (throttle valve) 4 and a suction valve V1, the branch conduit 2b is connected to an air supply source 7 via a flow rate control valve 6 and an air ejection valve V2, and the branch conduit 2c is connected to a water supply source 9 via a flow rate control valve 8 and a water ejection valve V3. The conduits 3, which each extend from the communication channels 14, merge into a single confluence conduit 3a, and the confluence conduit 3a is connected to the suction source 5 via a suction-openings suction valve V4. Here, the suction valve V1, the air ejection valve V2, the water ejection valve V3, and the suction-openings suction valve V4 are electrically connected to the controller 70, so that their on/off operations, specifically the establishment or interruption of communication between the holding surface 11a and the suction source 5, the establishment or interruption of communication between the holding surface 11a and the air supply source 7, the establishment or interruption of communication between the holding surface 11a and the water supply source 9, and the establishment or interruption of communication between the suction openings 12a and the suction source 5, are controlled by the controller 70.

The chuck table 11 is rotationally driven about a vertical central axis by an undepicted rotating mechanism. As depicted in FIG. 1, the grinding machine 1 according to this embodiment includes a rectangular box-shaped base 100 that is long in the Y-axis direction (front-to-rear direction), and the chuck table 11 is arranged in a rectangular opening 100a that opens in an upper surface of the base 100 and that is long in the Y-axis direction. Surroundings of the chuck table 11 in the opening 100a are covered by a plate-shaped rectangular cover 15, and front and rear (−Y direction and +Y direction) spaces of the cover 15 in the opening 100a are covered by bellows-shaped extendible covers 16 and 17, respectively, which are movable along with the cover 15 to extend or contract.

The grinding unit 20 includes a spindle motor 22 fixed on a holder 21, a vertical spindle 23 rotationally drivable by the spindle motor 22, a disk-shaped mount 24 secured to a lower end of the spindle 23, and a grinding wheel 25 detachably mounted on a lower surface of the mount 24. The grinding wheel 25 is configured by a disk-shaped wheel base 25a and a plurality of grinding stones 25b secured as processing elements in an annular pattern on a lower surface of the wheel base 25a.

The vertical moving mechanism 30 serves to raise or lower the grinding unit 20 along the vertical direction (Z-axis direction) relative to the holding surface 11a of the chuck table 11, and, as depicted in FIG. 1, is arranged on an end surface in the −Y direction (front surface) of a rectangular box-shaped column 101 vertically disposed upright on an end portion in the +Y direction (rear end portion) of the upper surface of the base 100. This vertical moving mechanism 30 serves to raise and lower a plate-shaped rectangular lift plate 31, which is secured on a rear surface of the holder 21, along with the holder 21 and the spindle 23 and the grinding wheel 25 held on the holder 21 in the Z-axis direction along a pair of left and right guide rails 32. The paired left and right guide rails 32 are vertically arranged in parallel to each other on the front surface of the column 101.

Between the paired left and right guide rails 32, a rotatable ball screw 33 is vertically disposed upright along the Z-axis direction (up-to-down direction), and the ball screw 33 is connected at an upper end thereof to a reversible servomotor 34 as a drive source. The servomotor 34 is attached in a vertical orientation via a plate-shaped rectangular bracket 35 secured on an upper surface of the column 101. The ball screw 33 is rotatably supported at a lower end thereof on the column 101. An undepicted nut member is disposed horizontally protruding rearward (+Y direction) on the rear surface of the lift plate 31, and is threadedly engaged with the ball screw 33.

When the servomotor 34 is driven to rotate the ball screw 33 in a forward direction or in a reverse direction, the lift plate 31 on which the undepicted nut member is disposed in threaded engagement with the ball screw 33 is moved up or down together with the grinding unit 20 along the Z-axis.

The horizontal moving mechanism 40 serves to move the chuck table 11 in the horizontal direction (Y-axis direction)

relative to the holding surface 11a, and, as depicted in FIG. 1, is arranged on a rectangular block-shaped internal base 102 accommodated inside the base 100. This horizontal moving mechanism 40 includes a block-shaped slider 41, which is slidable in the Y-axis direction along a pair of left and right guide rails 42 arranged in parallel to each other along the Y-axis direction (front-to-rear direction) on the internal base 102. The chuck table 11 and the undepicted rotating mechanism, which are supported on the slider 41, are thus slidable along with the slider 41 along the Y-axis direction.

Between the paired left and right guide rails 42 on the internal base 102, a rotatable ball screw 43 is arranged extending along the Y-axis direction (front-to-rear direction), and the ball screw 43 is connected at one end thereof in the Y-axis direction (left end in FIG. 1) to a reversible servomotor 44 as a drive source. The ball screw 43 is rotatably supported at the other end thereof in the Y-axis direction (right end in FIG. 1) by a bearing 45 disposed upright on the internal base 102. An undepicted nut member is disposed protruding downward from the slider 41, and is in threaded engagement with the ball screw 43.

When the servomotor 44 is driven to rotate the ball screw 43 in a forward direction or in a reverse direction, the undepicted nut member which is in threaded engagement with the ball screw 43 is caused to slide together with the slider 41 in the Y-axis direction (front-to-rear direction) along the ball screw 43, so that the chuck table 11 is also integrally moved together with the slider 41 along the Y-axis direction. As a result, the wafer W held under suction on the holding surface 11a of the chuck table 11 is also moved along the Y-axis direction.

The transfer pad 50 serves to hold the wafer W under suction and to transfer the same, and, as depicted in FIG. 1, is attached to a distal end of an arm 52 extending horizontally from an upper end of a rod 51 that vertically extends upright through the upper surface of the base 100 and that is movable up and down. Described specifically, an annular support ring 53 is attached to the distal end of the arm 52, and the disk-shaped transfer pad 50 is supported by three pins 54 on the support ring 53. As depicted in FIG. 3, around an outer peripheral surface of each pin 54 and between the support ring 53 and the transfer pad 50, a spring 55 is held under compression.

Now described with reference to FIG. 3 again, the transfer pad 50 is configured by a disk-shaped frame body 50A and a disk-shaped suction member 50B incorporated in a central portion of the frame body 50A. A conduit 56 that extends through the support ring 53 is connected at one end thereof to the central portion of the frame body 50A, and is connected at the other end thereof to a suction source 57. A suction valve V5 is connected to an intermediate portion of the conduit 56, and is electrically connected to the controller 70. Each on/off operation of the suction valve V5, specifically the establishment or interruption of communication between the suction member 50B of the transfer pad 50 and the suction source 57, is hence controlled by the controller 70.

Figure 2:
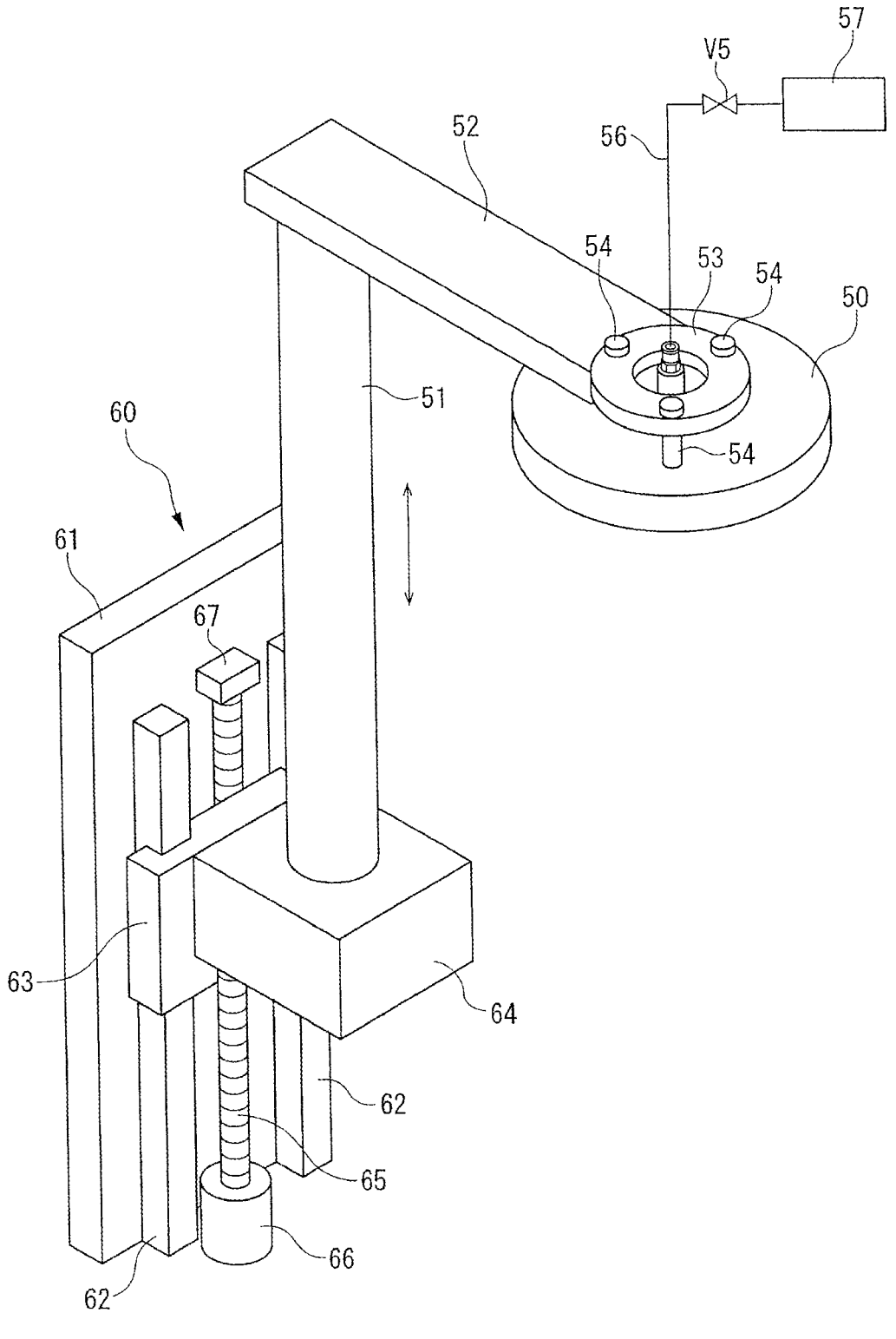
FIG. 2 is a perspective view depicting a transfer pad and its lift mechanism in the grinding machine depicted in FIG. 1.

The transfer pad 50 can be raised or lowered along the vertical direction (Z-axis direction) by a lift mechanism 60 depicted in FIG. 2, and the lift mechanism 60 is configured by a ball screw mechanism. Described specifically, as depicted in FIG. 2, a pair of front and rear guide rails 62 are vertically attached in parallel to each other on a plate-shaped rectangular plate 61 that is disposed vertically upright, and, on these guide rails 62, a lift plate 63 is fitted and held movably up and down. A rectangular block 64 is secured to the lift plate 63, and the rod 51 is secured at a lower end thereof to the block 64.

Between the paired front and rear guide rails 62, a reversible ball screw 65 is vertically arranged, and the ball screw 65 is connected at a lower end thereof to a servomotor 66 as a rotary drive source. The ball screw 65 is rotatably supported at an upper end thereof on the plate 61 via a bearing 67. As depicted in FIG. 3, a nut member 68 is disposed protruding toward the plate 61 on a back surface of the lift plate 63, and the ball screw 65 is threadedly inserted through the nut member 68.

When the servomotor 66 is driven to rotate the ball screw 65 in a forward direction or in a reverse direction, the lift plate 63 on which the nut member 68 in threaded engagement with the ball screw 65 is disposed protruding toward the plate 61 is moved up or down along with the block 64 and the rod 51, and thus, the transfer pad 50 supported on the rod 51 via the arm 52 and the support ring 53 is moved up and down along with the rod 51.

The controller 70 includes a central processing unit (CPU) that performs arithmetic processing in accordance with control programs, storage sections such as a read-only memory (ROM) and a random-access memory (RAM), and the like. This controller 70 controls the holding unit 10, the grinding unit 20, the vertical moving mechanism 30, the horizontal moving mechanism 40, the lift mechanism 60 for the transfer pad 50, and the like. In the unloading method of the first embodiment for the wafer W, the controller 70 also controls on/off operations of the suction valves V1 and V5, the air ejection valve V2, the water ejection valve V3, and the suction-openings suction valve V4. Details of the on/off operations of the suction valves V1 and V5, the air ejection valve V2, the water ejection valve V3, and the suction-openings suction valve V4 in the unloading method of the first embodiment for the wafer W will be described later.

A description will next be made of grinding processing of the wafer W to be performed with use of the grinding machine 1 configured as described above.

When applying grinding processing to the wafer W, the wafer W is placed on the holding surface 11*a* of the chuck table 11 with the protective tape directed downward. The suction source 5 that is connected to the porous member 11A of the chuck table 11 is then driven to evacuate the porous member 11A. Described specifically, the suction valve V1 depicted in FIG. 3 is opened, and, in addition, the air ejection valve V2, the water ejection valve V3, and the suction-openings suction valve V4 are closed. The air in the porous member 11A is then drawn by the suction source 5 through the communication channel 13, the conduit 2, the branch conduit 2*a*, and the flow rate control valve 4. Accordingly, a negative pressure is produced at the porous member 11A, and the wafer W placed on the upper surface (holding surface 11*a*) of the porous member 11A via the protective tape is held under suction by the negative pressure on the holding surface 11*a*.

From the state described above, the horizontal moving mechanism 40 is driven to move the chuck table 11 in the +Y direction (rearward), whereby the wafer W held under suction on the chuck table 11 is positioned below the grinding wheel 25 of the grinding unit 20. The undepicted rotating mechanism is then driven to rotate the chuck table 11, so that the wafer W held on the holding surface 11*a* of the chuck table 11 is kept rotating at a predetermined rotational speed, and the spindle motor 22 is also started to keep the grinding wheel 25 rotating.

With the wafer W and the grinding wheel 25 kept rotating as mentioned above, the vertical moving mechanism 30 is driven to lower the grinding wheel 25 in the −Z direction. Described specifically, when the servomotor 34 is driven and the ball screw 33 is rotated in the reverse direction, the lift plate 31 on which the undepicted nut member is disposed in threaded engagement with the ball screw 33 is lowered along with the grinding unit 20 in the −Z direction. Lower surfaces (processing surfaces) of the grinding stones 25*b* on the grinding wheel 25 are then brought into contact with the upper surface (back surface) of the wafer W. When the grinding wheel 25 is further lowered by a predetermined amount in the −Z direction from the state where the lower surfaces of the grinding stones 25*b* are in contact with the upper surface of the wafer W as described above, the upper surface of the wafer W is ground by the predetermined amount with the grinding stones 25*b*. During the grinding processing of the wafer W, grinding water (pure water) is supplied from an undepicted grinding water supply source to an area of contact between the grinding stones 25*b* and the wafer W.

After the upper surface of the wafer W has been ground by the predetermined amount as mentioned above, the wafer W is separated from the holding surface 11*a* of the chuck table 11, and the separated wafer W is unloaded from the chuck table 11 by the transfer pad 50. A description will hereinafter be made of the unloading method according to the first embodiment of the second aspect of the present invention for the workpiece.

Figure 4:
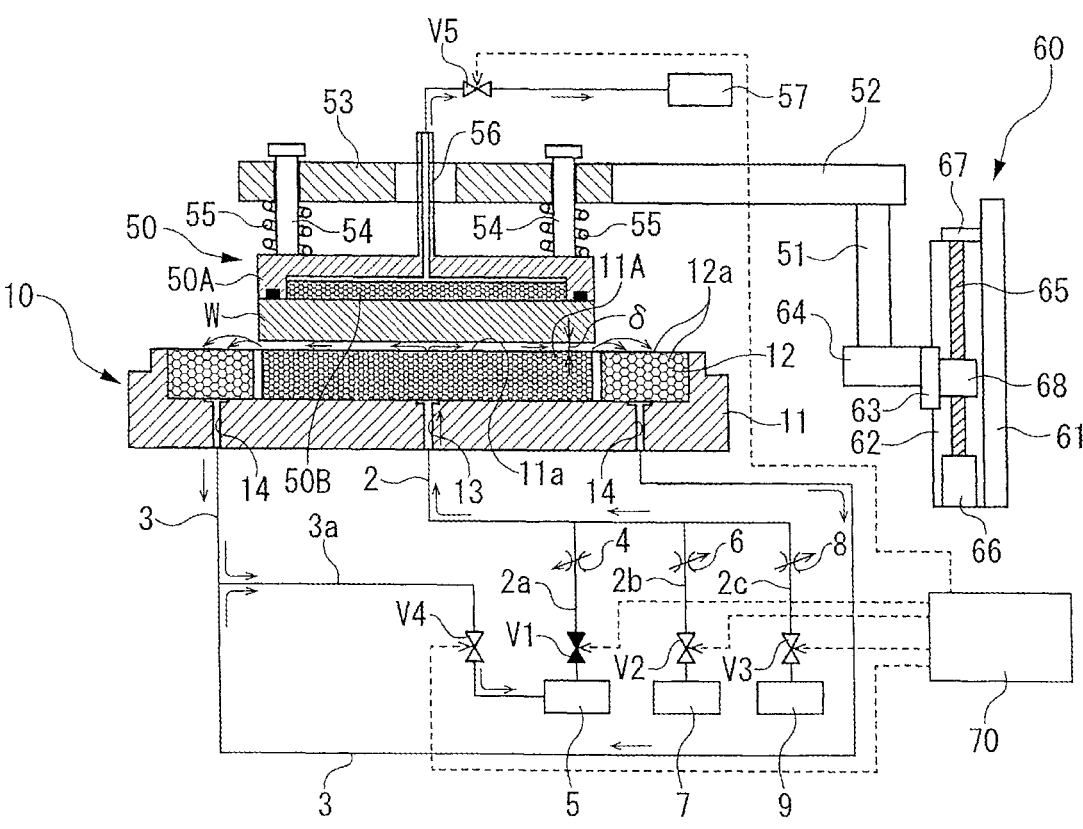
FIG. 4 is a partly cross-sectional view depicting a separation step and a drawing step in the workpiece unloading method according to the first embodiment of the second aspect of the present invention.

The unloading method according to the first embodiment for a wafer W1 as the workpiece will hereinafter be described with reference to FIGS. 3 to 5. In this embodiment, the description will be made of steps of holding the wafer W1, grinding processing of which has been completed, under suction on the transfer pad 50 and unloading the wafer W1 from the chuck table 11 when the wafer W1 has an outer diameter substantially the same as an outer diameter of the holding surface 11*a* of the chuck table 11. Described specifically, the wafer W1 is unloaded from the chuck table 11 sequentially through 1) a transfer pad lowering step, 2) separation and drawing steps, and 3) an unloading step. These steps will hereinafter be described sequentially.

1) Transfer Pad Lowering Step

In the transfer pad lowering step, the transfer pad 50 is lowered and positioned above the wafer W1 by the lift mechanism 60 as depicted in FIG. 3. At this time, under control by the controller 70, the suction valve V1 alone is kept open, and the remaining air ejection valve V2, water ejection valve V3, suction-openings suction valve V4, and suction valve V5 are kept closed, as in the grinding processing.

When the suction valve V1 is opened as mentioned above, the air in the porous member 11A of the chuck table 11 is drawn by the suction source 5 through the communication channel 13 formed through the central portion of the chuck table 11, the conduit 2, and the branch conduit 2*a* as indicated by arrows in FIG. 3. A negative pressure is hence produced at the porous member 11A, whereby the wafer W1 is drawn by the negative pressure and is held under suction on the holding surface 11*a* of the chuck table 11.

2) Separation and Drawing Steps

The separation step and the drawing step are concurrently performed. When the wafer W1 is to be separated from the holding surface 11*a* of the chuck table 11, the controller 70, as depicted in FIG. 4, closes the suction valve V1 alone, and opens the remaining air ejection valve V2, water ejection valve V3, suction-openings suction valve V4, and suction valve V5. As a result, the air supplied from the air supply source 7 flows into the conduit 2 through the branch conduit 2b, and, at the same time, the water supplied from the water supply source 9 flows into the conduit 2 through the branch conduit 2c. A mixed fluid (two-component fluid) in which air and water are mixed together is hence formed in the conduit 2, and this mixed fluid blows out from the holding surface 11a of the porous member 11A toward the wafer W1 through the communication channel 13 formed through the central portion of the chuck table 11. The wafer W1 is then caused to float by a pressure of the mixed fluid received at a lower surface thereof. As the suction member 50B of the transfer pad 50 is being evacuated by the suction source 57 at this time, the wafer W1, as depicted in FIG. 4, is held under suction on the suction member 50B, and a clearance δ is formed between the wafer W1 and the holding surface 11a of the chuck table 11.

When, in the above-described separation step, the wafer W1 has been separated and held under suction on the suction member 50B of the transfer pad 50 and the clearance δ has been formed between the wafer W1 and the holding surface 11a of the chuck table 11, the mixed fluid which contains grinding debris drawn to the porous member 11A of the chuck table 11 during grinding processing blows out toward the lower surface of the wafer W1, and this mixed fluid strikes the lower surface of the wafer W1 and flows toward an outside in a radial direction of the wafer W1, to flow out from an outer periphery of the wafer W1. At this time, the suction member 12 disposed on the chuck table 11 is being evacuated by the suction source 5. The air in the suction member 12 is thus drawn by the suction source 5 through the communication channels 14 formed in the outer peripheral portion of the chuck table 11, the conduit 3 connected to the respective communication channels 14, and the confluence conduit 3a as indicated by arrows in FIG. 4, so that a negative pressure is produced at the suction member 12.

When the suction member 12 disposed on the chuck table 11 is evacuated by the suction source 5 as mentioned above, the mixed fluid which flows out from the outer periphery of the wafer W1 is drawn from the suction openings 12a opening in the upper surface of the suction member 12. The processing debris which is contained in the mixed fluid blown out from the outer periphery of the wafer W1 thus does not contaminate a side surface and upper surface of the wafer W1. As a result, the mixed fluid with grinding debris contained therein is prevented from splashing, and rinsing of the wafer W1 can be performed in a short period of time.

3) Unloading Step

Figure 5:
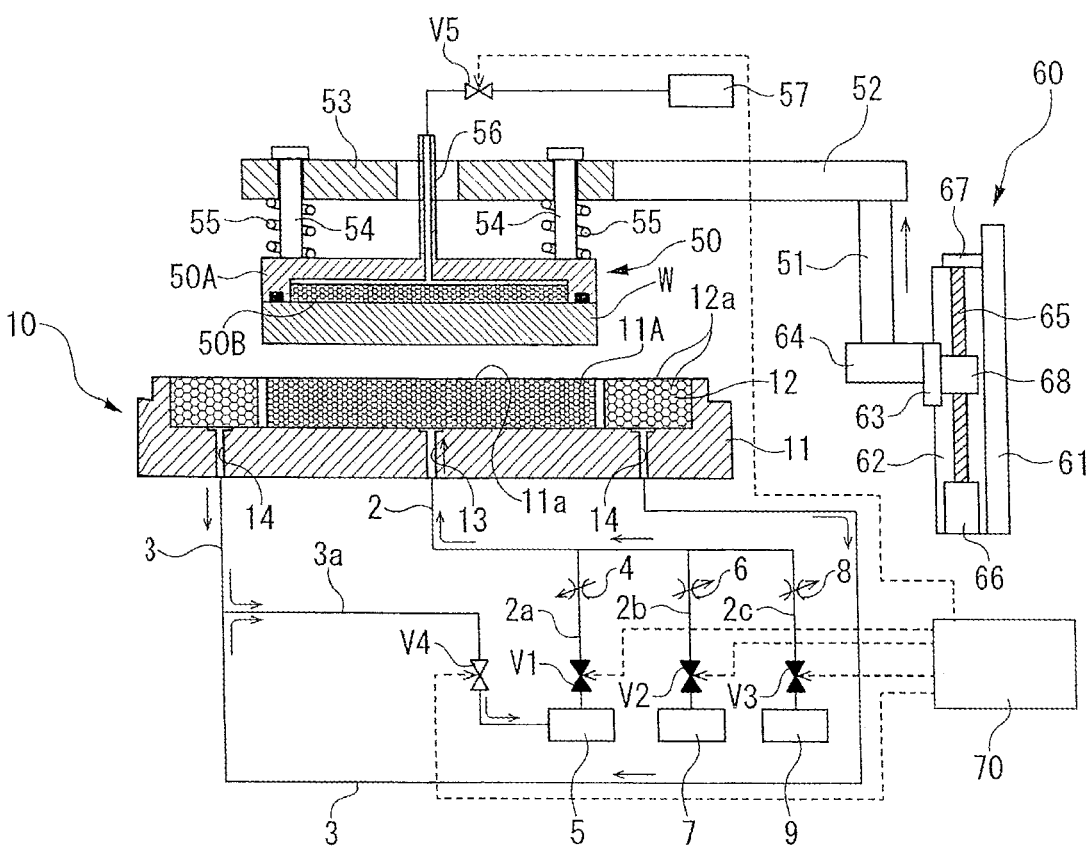
FIG. 5 is a partly cross-sectional view depicting an unloading step in the workpiece unloading method according to the first embodiment of the second aspect of the present invention.

After the mixed fluid with grinding debris contained therein has been removed from the wafer W1 by its drawing through suction member 12 in the above-described separation and drawing steps, the wafer W1 is unloaded from the chuck table 11 in the next unloading step by driving the servomotor 66, as depicted in FIG. 5, rotating the ball screw 65 in the forward direction, and raising the transfer pad 50. At this time, the suction valve V1, the air ejection valve V2, and the water ejection valve V3 are kept closed, and the suction-openings suction valve V4 and the suction valve V5 are kept open.

Figure 6:
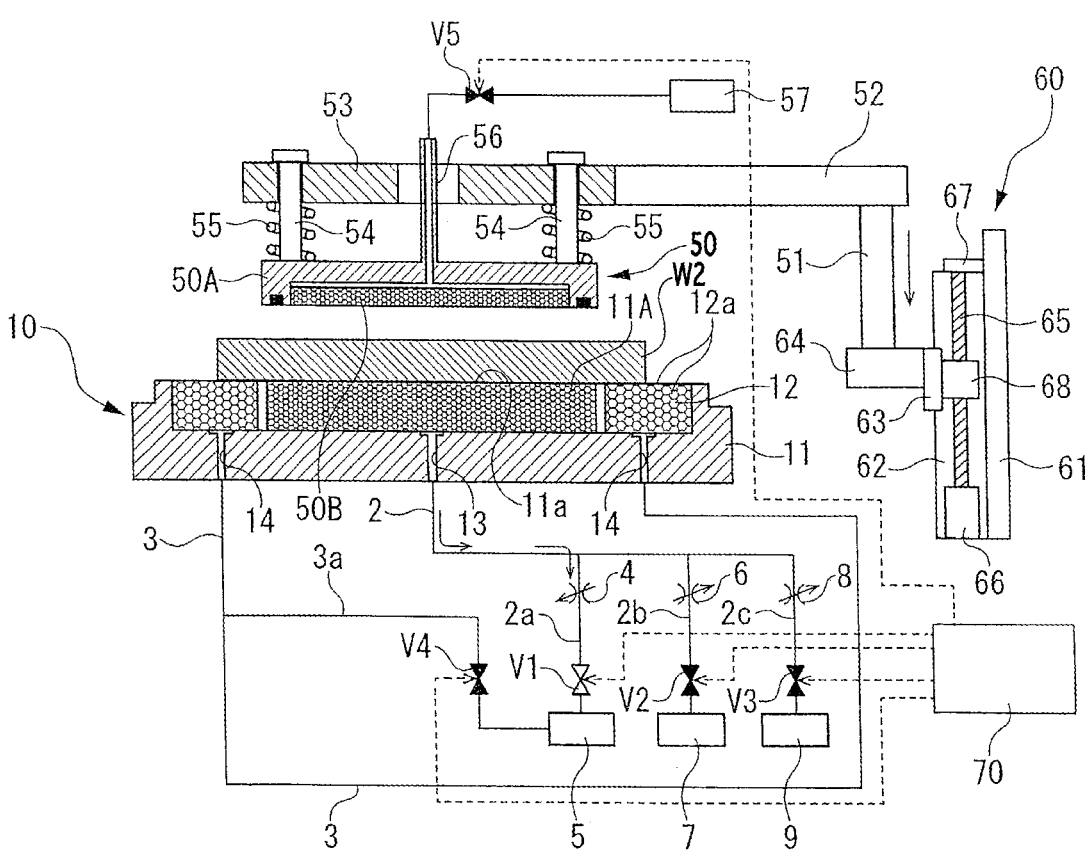
FIG. 6 is a partly cross-sectional view depicting a lowering step of the transfer pad in a workpiece unloading method according to a second embodiment of the second aspect of the present invention.
Figure 7:
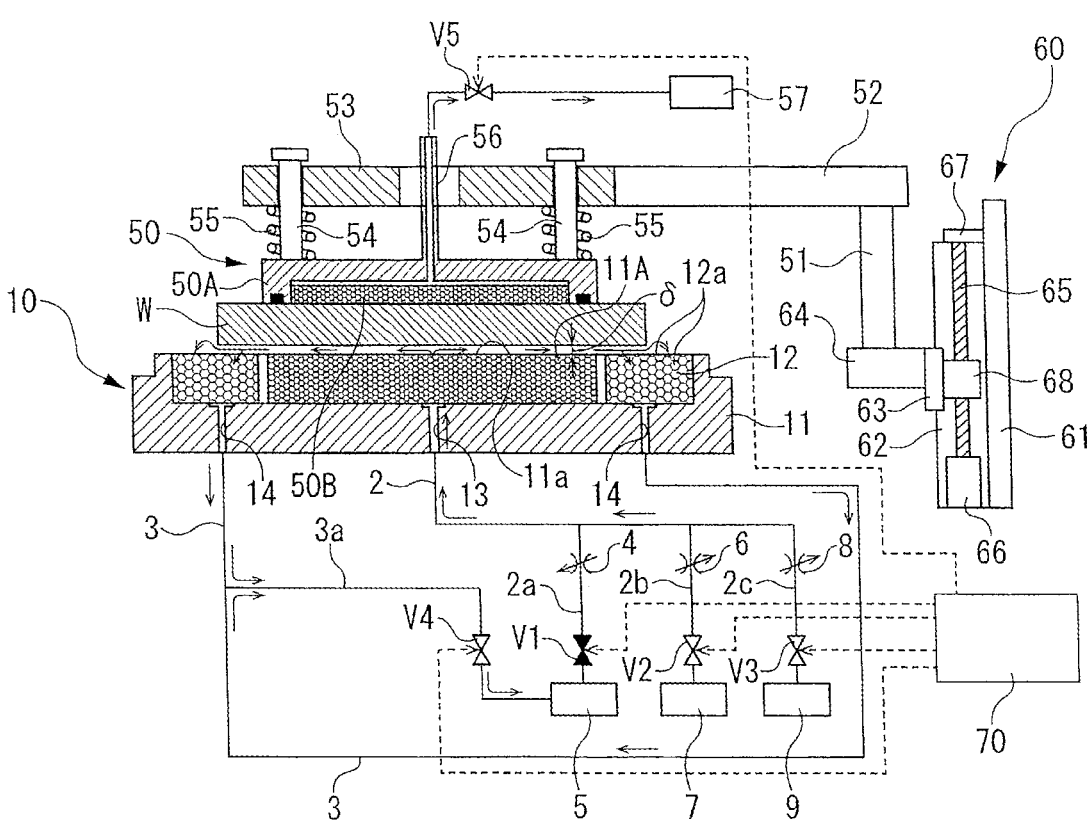
FIG. 7 is a partly cross-sectional view depicting a separation step and a drawing step in the workpiece unloading method according to the second embodiment of the second aspect of the present invention.
Figures 8, 9:
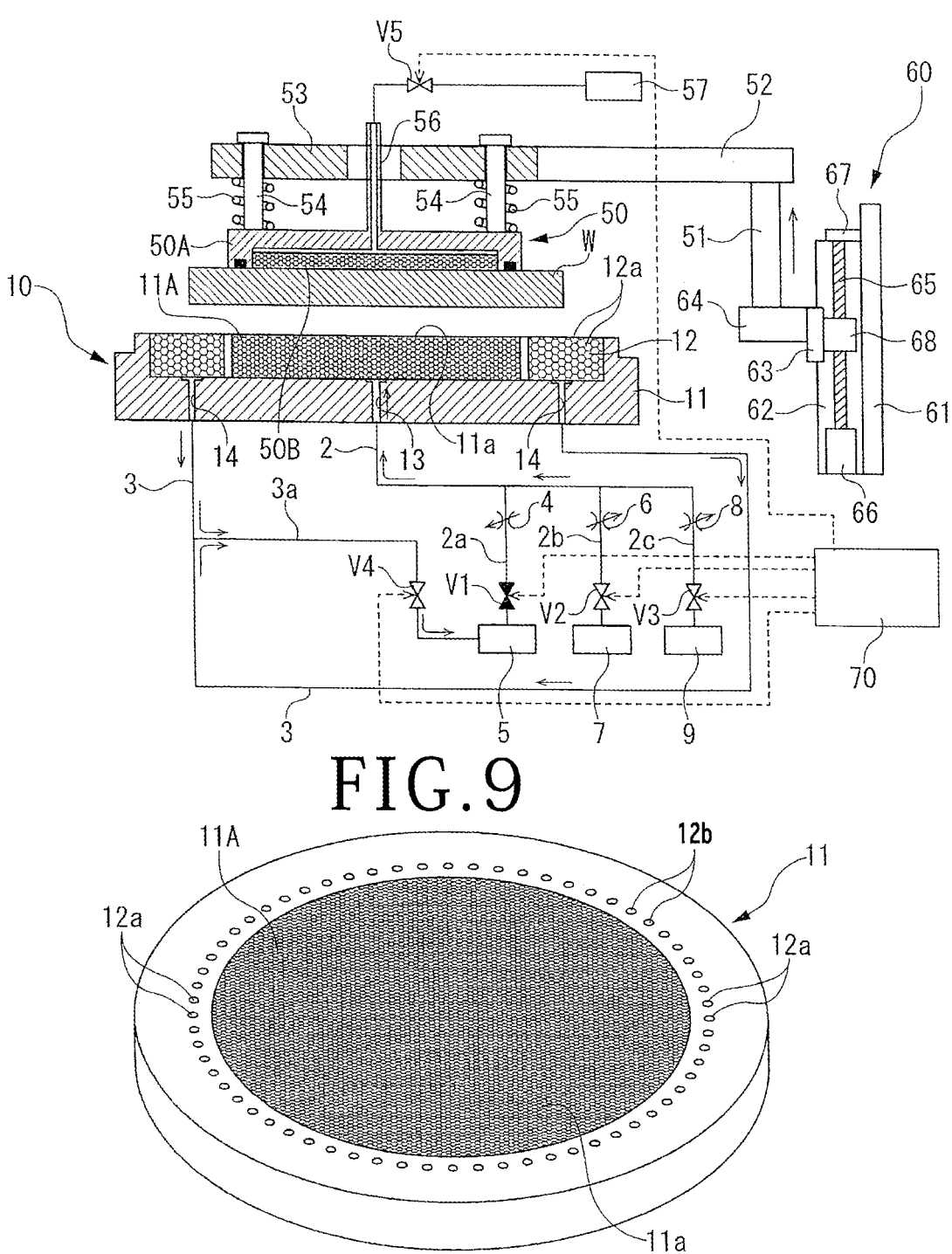
FIG. 8 is a partly cross-sectional view depicting an unloading step in the workpiece unloading method according to the second embodiment of the second aspect of the present invention.
FIG. 9 is a perspective view depicting a first modification of a chuck table in the grinding machine depicted in FIG. 1.

Described with reference to FIGS. 6 to 8, an unloading method according to the second embodiment of the second aspect of the present invention for the workpiece will next be described. As depicted in FIGS. 6 to 8, the unloading method of the second embodiment is useful for a wafer W2 having an outer diameter greater than the outer diameter of the holding surface 11a of the chuck table 11. In this unloading method, 1) a transfer pad lowering step, 2) separation and drawing steps, and 3) an unloading step are also sequentially performed as in the above-described first embodiment of the second aspect. In this second embodiment, the transfer pad lowering step depicted in FIG. 6 and the unloading step depicted in FIG. 8 are the same as the transfer pad lowering step (see FIG. 3) and the unloading step (see FIG. 5) in the above-described first embodiment. Accordingly, a repeated description of these steps is omitted, and the separation and drawing steps alone will hereinafter be described with reference to FIG. 7.

In the separation and drawing steps in this embodiment, the outer diameter of the wafer W2 is greater than the outer diameter of the holding surface 11a of the chuck table 11, so that the wafer W2 protrudes in a ring shape at an outer peripheral portion thereof outward in a radial direction from the outer periphery of the holding surface 11a. With this wafer W2, the mixed fluid that blows out from the holding surface 11a of the chuck table 11 also applies a pressure to a lower surface of the wafer W2. Accordingly, the wafer W2 is upwardly separated from the holding surface 11a, and, as depicted in FIG. 7, a clearance δ is formed between an upper surface of the wafer W2 and the lower surface of the transfer pad 50.

When, with the clearance δ formed between the upper surface of the wafer W2 and the lower surface of the transfer pad 50 as mentioned above, the mixed fluid that contains grinding debris drawn to the porous member 11A of the chuck table 11 during grinding processing blows out toward the lower surface of the wafer W2, the mixed fluid strikes the lower surface of the wafer W2, flows outward in the radial direction of the wafer W2 through the clearance δ, and flows out from an outer periphery of the wafer W2. Because the outer peripheral portion of the wafer W2 protrudes in the ring shape outward in the radial direction from the outer periphery of the holding surface 11a of the chuck table 11 as mentioned above, and covers a portion of the suction member 12 from above, the evacuation of the suction member 12 by the suction source 5 allows the mixed fluid which has flowed out from the outer periphery of the wafer W2 to be drawn from the suction openings 12a formed in the suction member 12, without flowing around from a side surface to the upper surface of the wafer W2. Splash of the mixed fluid with the grinding debris contained therein is prevented more effectively, further ensuring the performance of rinsing of the wafer W2 in a short period of time. It is to be noted that, in FIGS. 6 to 8, elements identical to those depicted in FIGS. 3 to 5 are identified by the same numerals.

In the configurations adopted in the foregoing embodiments, the porous suction member 12 is arranged outside in the radial direction of the holding surface 11a of the chuck table 11, and the mixed fluid is drawn from the suction openings 12a that open in the upper surface of the suction member 12. As depicted in FIG. 9, a configuration may also be adopted as a first modification in which a plurality of bore-shaped suction openings 12b are formed at equal angular pitches in a circumferential direction on the same circumference in an outer peripheral upper surface of the holding surface 11a of the chuck table 11. In this first modification, the suction openings 12b may also be formed in two concentric rows on inner and outer double circumferences.

Figure 10:
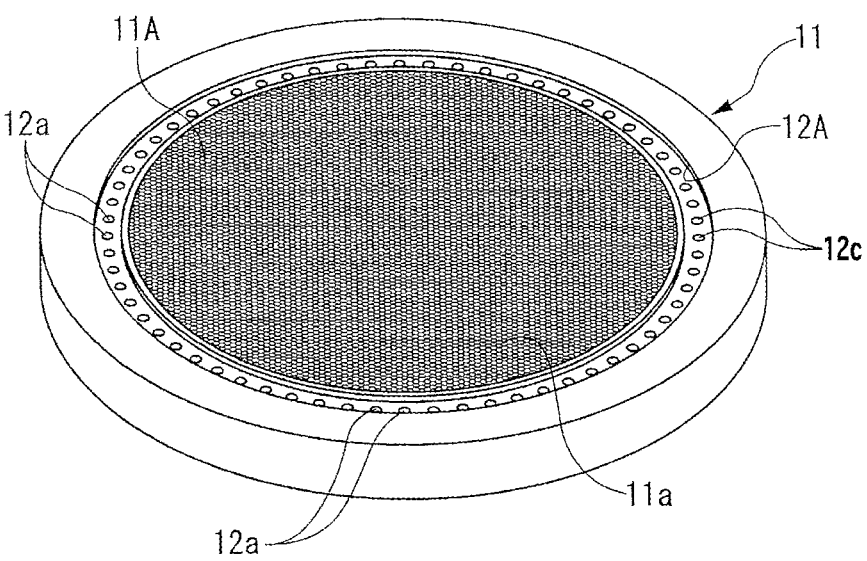
FIG. 10 is a perspective view depicting a second modification of the chuck table in the grinding machine depicted in FIG. 1.

Further, as depicted in FIG. 10, another configuration may also be adopted as a second modification in which a ring-shaped groove 12A is formed in the outer peripheral upper surface of the holding surface 11a of the chuck table 11, and a plurality of suction openings 12c are open in a bottom surface of the groove 12A.

The foregoing describes the grinding machine 1 as the processing machine according to the first embodiment of the first aspect of the present invention, and the unloading methods according to the first and second embodiments of the second aspect of the present invention as applied for the unloading of the wafers W1 and W2 in the grinding machine 1. However, the present invention can also be similarly applied to desired processing machines, such as polishing machines and cutting machines, other than grinding machines, and also to unloading methods of wafers or desired workpieces other than wafers in the desired processing machines.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A processing machine comprising:
a holding unit that has a holding surface and holds a workpiece under suction on the holding surface;
a processing unit that processes the workpiece held under suction on the holding surface; and
a controller that controls the holding unit and the processing unit,
wherein the holding unit includes
a suction valve that establishes or interrupts communication between the holding surface and a suction source,
a fluid ejection valve that establishes or interrupts communication between the holding surface and a fluid supply source,
a plurality of suction openings that are arranged in a ring pattern outside of the holding surface and draw fluid ejected from the holding surface, and a suction-openings suction valve that establishes or interrupts communication between the suction openings and the suction source, and
the controller is configured to control closing of the suction valve, opening of the fluid ejection valve, and opening of the suction-openings suction valve.

2. An unloading method of a workpiece for unloading the workpiece, the workpiece being held under suction on a holding surface of a holding unit communicating with a suction source, from the holding surface, with use of a processing machine,
the processing machine including a holding unit having a holding surface, a processing unit that processes the workpiece held under suction on the holding surface, and a controller configured to control the holding unit and the processing unit,
the holding unit including a suction valve that establishes or interrupts communication between the holding surface and the suction source, a fluid ejection valve that establishes or interrupts communication between the holding surface and a fluid supply source, a plurality of suction openings that are arranged in a ring pattern outside of the holding surface and draw fluid ejected from the holding surface, and a suction-openings suction valve that establishes or interrupts communication between the suction openings and the suction source,
the unloading method comprising:
a separation step of separating the workpiece from the holding surface by closing the suction valve and opening the fluid ejection valve such that the fluid is supplied to the holding surface; and
an unloading step of unloading, from the holding surface, the workpiece separated from the holding surface, wherein
the separation step includes a drawing step of opening the suction-openings suction valve and drawing the fluid outside of the holding surface.

* * * * *